United States Patent Office 2,708,827
Patented May 24, 1955

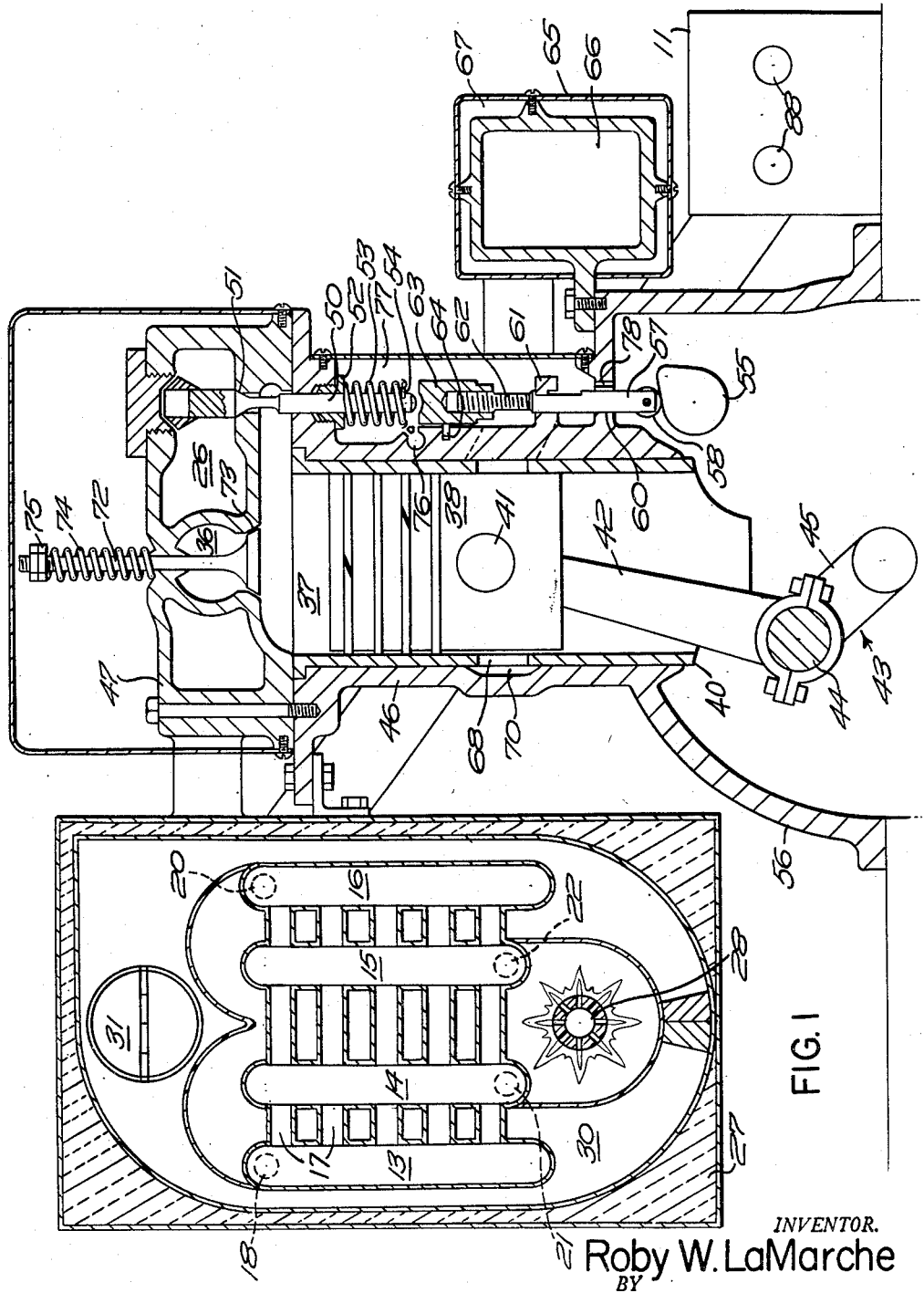

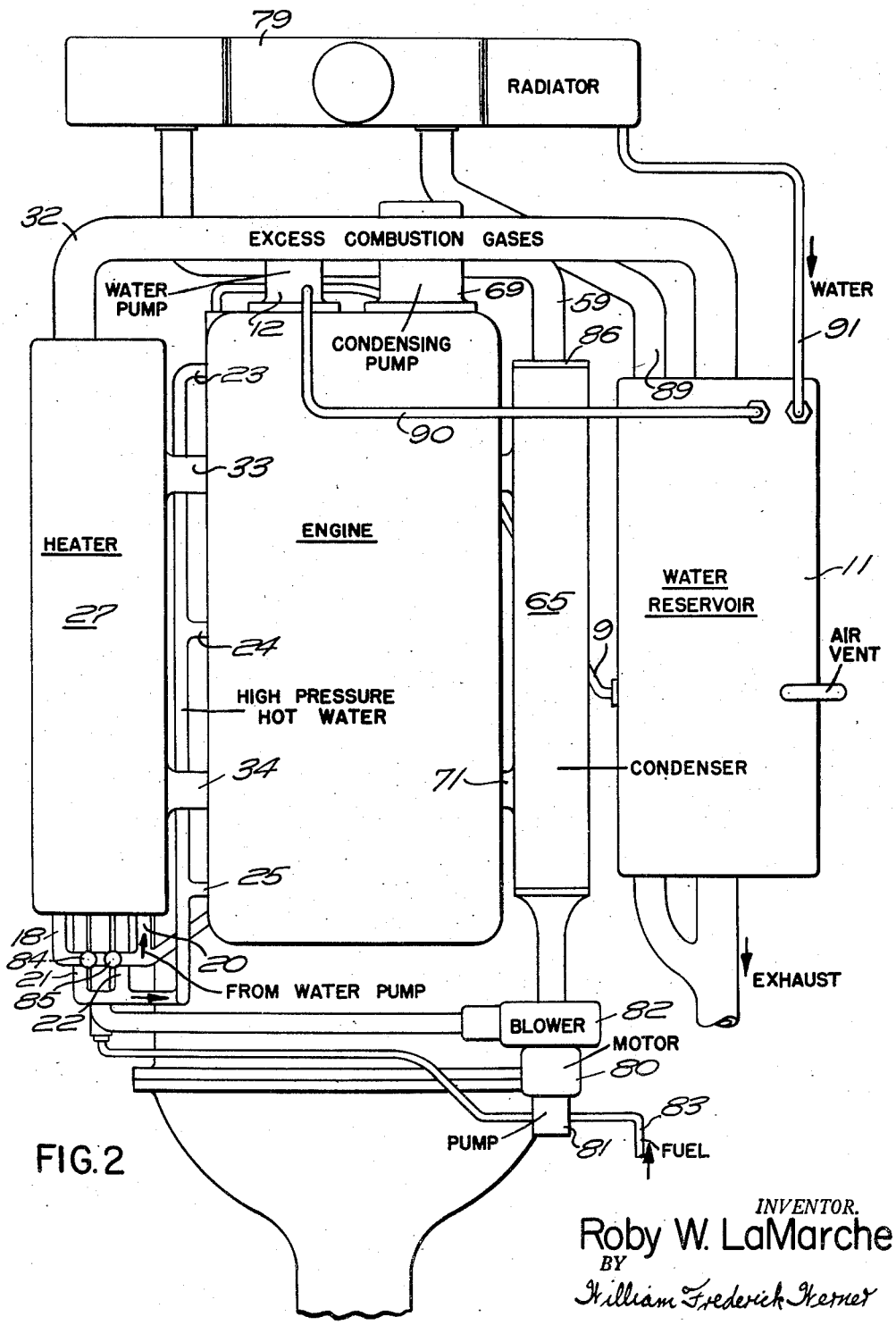

2,708,827
HOT GAS ENGINE WITH HIGH PRESSURE WATER INJECTION

Roby W. La Marche, Wakefield, R. I.

Application November 18, 1952, Serial No. 321,226

3 Claims. (Cl. 60—39.54)

This invention relates to a heat vapor engine and more particularly to an engine in which hot vapor is admitted into a piston cylinder containing hot air, thereby expanding the vapor and operating the piston.

One of the objects of the present invention is to provide a highly efficient, silent engine using non-critical fuel and possessing inherent speed regulations.

Another object of this invention is to provide an engine which will increase its power output when a load is applied and decrease its power output when the load is taken off without changing the throttle setting.

Another object of the present invention is to provide an engine with a closed cycle vapor supply.

Still another object of the present invention is to provide an engine which will operate under a wide range of heat and pressure conditions and which will determine the thermal efficiency and brake horsepower output of the engine.

Other objects of the present invention will be pointed out in part and become apparent in part in the following specification and claims.

In the conventional steam boiler a high degree of insulation is caused by air bubbles forming on the inside of the boiler and insulating the water from the source of heat. Any expansion of steam causes heat losses and therefore loss of power available to the steam engine. The first loss encountered in the steam boiler is the expansion of steam allowed into the unheated conduction pipe. The second loss is the expansion of steam from the boiler side to the engine side of the throttle in all instances where the throttle is not wide open. The third loss is the expansion of steam from the steam chest through the valves and into the unheated cylinder head. The conventional boiler has no further use of the heated combustion gases after the water is heated. The present invention overcomes these deficiencies by utilizing the heated combustion gases in the cylinder head as an aid to the further expansion of the vapor in the cylinder head, thus producing more power from heat which heretofore has been wasted. A further thermal efficiency is attained by utilization of the heat in the exhaust manifold foreheating the air supplied to the burner. The present invention does not allow steam to form in the boiler, thus eliminating bubble insulation. No expansion is permitted until the steam is utilized for power and then it is further heated which causes a greater expansion.

The advantages of the present invention over gasoline or diesel engines is manifold, for example: No water jacket is required to cool the cylinder resulting in the elimination of weight and expensive castings. The fuel used in the burner can be anything that produces heat, therefore, is non-critical as to viscosity, vaporization temperature, ignition points, burning time, chemical components and requires no special vaporizing equipment such as a carburetor or fuel injector. A heat exchanger may be substituted for the burner utilizing the heat generated in certain industrial processes. The fuel consumption is directly proportional to the revolutions per minute thus eliminating the current common practice used in diesel and gasoline engines of running at high speed to obtain the lowest consumption in pounds of fuel per brake horsepower per hour. This greatly extends the working life of the heat vapor engine over gasoline or diesel engines.

The advantages of the present invention over the conventional steam engine are as follows: Elimination of the boiler heat losses due to insulation caused by air bubbles on the inside of the boiler. Elimination of transference losses due to condensation in pipes leading to the engine. Elimination of complicated linkages controlling the length of the power stroke. And the better utilization of the exchange of heat for power.

Referring to the drawings in which similar characters of reference indicate corresponding parts in all the figures:

Figure 1 is a longitudinal cross sectional view through the new heat vapor engine.

Figure 2 is a diagrammatic view showing the various component parts of the new heat vapor engine.

In proceeding with this invention, water stored in reservoir 11 is pumped by means of pump 12 (see Figure 2) and conduit 9 to boiler chambers 13, 14, 15 and 16 interconnected by tubes 17 through water inlets 18 and 20 in boiler chambers 13, 16 at a pressure of preferably 1700 p. s. i. Pressurized water outlets 21 and 22 in boiler chambers 14 and 15 have conduits 23, 24 and 25 connecting (see Figure 2) to cylinder head water compartment 26.

A heater 27 provided with burner 28 produces hot combustion gases which circulate in space 30, heating boiler chambers 13, 14, 15, 16 and tubes 17 exhausting through butterfly valve 31, located in the top of heater 27 and by means of conduit 32 passing through reservoir 11 where it preheats the feed water for pump 12.

Accesses 33, 34 are provided from space 30 to chambers 35 (not shown) and 36 for the exhaust gases which will be used in the cylinder 37 to increase the thermal efficiency of the power stroke.

Piston 38 slidably mounted in skirt 40 is connected through wrist pin 41 to piston rod 42 which forms part of crank shaft 43 comprising crank pin 44 and crank 45. Skirt 40 is housed in engine block 46 which has cylinder head 47 secured thereto.

A pressure loaded valve 50 engages valve seat 51 in cylinder head 47 and is slidably mounted in bushing 52 adjustably secured in block 46. A spring 53 is held between bushing 52 and snap ring 54 housed in valve 50.

A timing cam 55 located in crank case 56 which forms part of engine block 46, is driven in timed relation with crank shaft 43. A cam follower 57 provided with a roller 58 which engages cam 55 is slidably mounted in block 46 at 60 and in bracket 61 which is integrally formed with block 46. Cam follower 57 has one end 62 threaded to adjustably engage spur gear 63 operably connected to rack 64 secured in engine block 46. Spur gear 63 actuates valve 50 in timed relation with cam 55. A manifold 65 provided with a condensation chamber 66 and an air intake 67 is secured to crank case 56.

Skirt 40 is provided with a series of ports 68 which are in alignment with channel 70 in engine block 46 and which connects to a conduit 71 leading to condensation chamber 66. A condensing pump 69 located in conduit 59 connecting condensation chamber 66 with the bottom of a radiator 79, draws the exhaust gases and vapor from cylinder 37 to radiator 79.

A valve 72 slidably mounted in cylinder head 47 engages valve seat 73 in cylinder head 47. A spring 74 is provided on valve 72 and is adjustably positioned by means of nut 75 engaging threads on valve 72.

When piston 38 is at the bottom of the stroke, condensing pump 69 will effectively draw out the exhaust gases and vapor from cylinder 37. Valve 72 controlling chamber 36 is caused to open by means of the vacuum created in cylinder 37, and the hot exhaust gases enter cylinder 37. As the cylinder compresses the gases, the valve is caused to close and the gases increase in temperature due to the compressing action. As the piston 37 approaches the top of its stroke cam 55 actuating cam follower 57 causes valve 50 to leave valve seat 51, thereby admitting water into cylinder 37. The water in cylinder head water compartment 26 under 1700 p. s. i. at 600 degree Fahrenheit turns to steam upon the drop in pressure. The steam in cylinder 37 mixing with the exhaust gases causes a vapor expansion which forces piston 38 downward, in a power stroke. The cycle is then repeated where a two stroke cycle engine is employed.

Spur gear 63 operated by rack 64 changes the setting of spur gear 63 on cam follower 57 through threads 62 and thereby the period of time valve 50 leaves valve seat 51 and the amount of vapor which can enter cylinder 37. The spur gear 63 and rack 64 are the engine trottle. Oil for lubricating this mechanism passes through oil conduit 76 into chamber 77 and through oil escape port 78 into crank case 56.

A motor 80, see Figure 2, drives both the fuel pump 81 and the blower 82 leading to the burner 28. By way of example, conduit 83 is deemed to lead from a fuel oil tank but any type of fuel may be used for burner 28. Inlet 18 is provided with a shut off cock 84 and an air bleeder cock 85 which are employed when water is drawn into water chambers 13, 14, 15 and 16. Air from the atmosphere is drawn through duct 86 into air intake 67 surrounding condensation chamber 66 where the air is preheated by the exhaust gases and vapor prior to reaching the blower 82 and space 30 where air and fuel mix into a combustible gas mixture ignited by burner 28.

Dry gases from the top of radiator 79 pass into conduit 89 which passes under reservoir 11 and connects with conduit 32 and exhausts into the atmosphere. Section 32 passes through reservoir 11 preheating the water therein. The water in radiator 79 passes through conduit 91 to reservoir 11. Thus establishing a closed water circulating system.

Conduit 90 connects water reservoir 11 with water pump 12. Its purpose is to return excess water from said pump 12 through a pressure release valve to the reservoir 11 when the pressure exceeds 1700 p. s. i. in the boiler chambers 13, 14, 15 and 16.

Having shown and described a preferred embodiment of the present invention, by way of example, it should be realized that structural changes could be made, variations in temperature and pressure could be given without departing from either the spirit or scope of this invention.

What I claim is:

1. In combination, a heat vapor engine with an expansible gas comprising a closed cycle system for water including a reservoir and boiler tanks, a heater provided with a burner and a space to accommodate said tanks, a fuel and air supply to said burner, an engine comprising an engine block, having a channel, a skirt provided with ports aligned with said channel secured in said engine block to form a piston cylinder, a crank case secured to said engine block, a piston slidably mounted in said skirt with a stroke which places the top of the piston below the ports in said skirt at one point in the stroke, a crank shaft in said crank case, a piston rod operably connecting said crank shaft to said piston, a cylinder head provided with a water compartment and a chamber fixed to said engine block, a valve seat in said chamber, a valve slidably mounted in said cylinder head engageable and disengageable with said valve seat, an adjustably mounted spring on said valve urging said valve into engagement with said valve seat, a conduit connecting said chamber with said space in said heater, a timing cam located in said crank case and operably connected in timed relation with said crank shaft, a cam follower slidably mounted in said engine block in operative engagement with said timing cam, a pressure loaded valve slidably mounted in said engine block, and said cylinder head, a valve seat in said water compartment, said pressure loaded valve normally engageable with said valve seat, said pressure loaded valve operably connected to said cam follower to disengage said valve seat in timed relation with said timing cam, a conduit connecting said water compartment with said boiler tanks, a conduit connecting said reservoir with said boiler tanks, a pump interposed in said conduit to pressurize the water in said boiler tanks, said heater raising the temperature of the water in said boiler tanks, a valve in said space in said heater, a manifold provided with a condensation chamber and an air intake secured to said engine block, a conduit in said reservoir, a radiator, a conduit connecting the radiator with the condensation chamber of the manifold, another conduit connecting said radiator with said reservoir and still a third conduit connecting said water pump with said reservoir.

2. In combination, a heat vapor engine with an expansible vapor consisting of a water reservoir, boiler tanks, a pump connected by conduits to said reservoir and said boiler tanks said pump pressurizing the water in said boiler tanks with a pressure between 1700 pounds per square inch and 3000 pounds per square inch, a heater, a burner in said heater, a space in said heater to accommodate said boiler tanks, said heater raising the temperature of the water to 600 degrees Fahrenheit, and engine block provided with a piston cylinder, a channel formed in the engine block and in the wall of the piston cylinder, a piston slidably mounted in said piston cylinder, a cylinder head provided with a water compartment and a chamber, valves controlling the ingress of said water compartment and said chamber with said piston cylinder, a conduit connecting said space in said heater with said chamber, another conduit connecting said water tanks with said water compartment, a second pump operably connected to said channel to draw out the exhaust vapors in said piston cylinder and create a partial vacuum in said piston cylinder thereby causing the valve controlling said chamber to permit ingress into said piston of hot exhaust gases from said heater space, the compression stroke of said piston causing said valve to seat and prevent ingress into the piston cylinder of said hot exhaust gases, the valve controlling the ingress of the water under heat and pressure operating in timed relation with said piston stroke to permit ingress of said water into said piston cylinder as the piston reaches the top of the compression stroke, said water vaporizing upon entrance into said piston cylinder with the release of pressure on said water, the heat of the water vapor being increased when engaging said hot exhaust gases and thereby providing an expansible vapor which will operate on said piston to provide a power stroke.

3. In combination, a heat vapor engine with an expansible vapor capable of driving a piston, comprising a water reservoir, boiler tanks, a pump connected by conduits to said reservoir and said boiler tanks, said pump pressurizing the water in said boiler tanks to a pressure approximating 1700 p. s. i. pounds per square inch, a heater, a burner in said heater, a space in said heater to accommodate said boiler tanks, the hot exhaust gases from the heater raising to the top of said space, said heater raising the temperature of the water to approximately 600 degrees Fahrenheit, and engine block provided with a cylinder, means provided to withdraw the exhaust vapors from said cylinder and provide a partial vacuum in said piston cylinder, a piston slidably mounted in said piston cylinder, a cylinder head provided with a water compartment and a chamber fixed to said engine block, a conduit connecting the top of said space with said chamber, a valve controlling the ingress of said hot exhaust gases into said piston cylinder, the ingress position of said valve being under the control of the vacuum in said piston cylinder, the non-ingress position of said valve being under the control of the pressure stroke of said cylinder, a conduit connecting said boiler tanks with said water compartment, a valve operated in timed relation with said piston stroke to permit ingress of the water in the water compartment to said piston cylinder, said water vaporizing upon entrance into said piston cylinder with the release of pressure on said water, the heat of the water vapor being increased when engaging said hot exhaust gases in said piston cylinder to form an expansible vapor, said valve operating in timed relation with said piston stroke having an adjustment controlling the time said valve is in ingress position.

References Cited in the file of this patent

FOREIGN PATENTS

| | | |
|---|---|---|
| 468,610 | France | Apr. 28, 1914 |
| 7,637 | Great Britain | Apr. 7, 1908 |
| 24,817 | Great Britain | Oct. 29, 1912 |
| 52,331 | Norway | Mar. 20, 1933 |